Oct. 25, 1938. W. M. SCHOLL Re. 20,899

CARD FOR CORN PADS AND THE LIKE

Original Filed April 26, 1935

Inventor
William M. Scholl.

by Charles Orsdell Atty.

Reissued Oct. 25, 1938

Re. 20,899

UNITED STATES PATENT OFFICE 20,899

CARD FOR CORN PADS AND THE LIKE

William M. Scholl, Chicago, Ill.

Original No. 2,037,343, dated April 14, 1936, Serial No. 18,316, April 26, 1935. Application for reissue July 26, 1937, Serial No. 155,739

15 Claims. (Cl. 206—79)

This invention relates to improvements in a card for corn pads, bunion pads and other medical pads or similar devices, the card being in the nature of a backing or mounting card to function as a carrying medium for a plurality of the pads.

In the past, many and various cards or carrying mediums for medical pads and similar items have been developed to function either as a backing member in an individual package of the pads or to function as a display member. In many cases, the pads had to be put up separately, and then so many of the separately packaged pads placed in a box or other carton. In no instance of which I am aware were the pads ever mounted upon a card which functioned both as a carrying medium for a plurality of the pads in an individual package for sales purposes and, at the same time, function as a display card for the purpose of stimulating sales. Further, all of these formerly known cards and carrying mediums have proven objectionable in that they could not be manufactured and used with sufficient economy and required an objectionable amount of labor to attach the pads thereto.

Accordingly, it is an object of this invention to provide a simple and economical mounting card for a plurality of medical pads or the like, capable of functioning as an ordinary carrying member for a plurality of the pads for an individual sales package, or as a display card for stimulating sales.

Another object of this invention is the provision of a mounting card of the character described herein which is extremely simple in construction and economical to manufacture, and which is arranged to directly support a plurality of medical pads or similar devices without resort to the adhesived surface of a pad or any extraneous means to hold the pads upon the card.

Also an object of this invention is the provision of a mounting card which may be die-cut so that portions of the card may be pressed out of the plane of the card for engagement with devices to be held by the card.

A further object of the invention is the provision of a mounting card for medical pads or the like having apertures or recesses therein, the card being so constructed that a portion of the card may be readily inserted in the recess or aperture to engage a pad and hold the same upon the card.

Still a further object of this invention is to provide a mounting card for medical pads and the like arranged for ready removal of a portion of the card together with a pad for sales purposes, or to make it possible to carry a pad from place to place with adequate protection for the adhesived surface of the pad.

It is also an aim of this invention to provide a mounting card for medical pads and the like arranged to adequately protect the adhesived surfaces of the pads and yet necessitate neither deterioration nor mutilation of these surfaces in any degree whatsoever.

While some of the more salient features, characteristics and advantages of the present invention have been above pointed out, others will become apparent from the following disclosures.

The invention includes these and other features of construction hereinafter described and shown in a preferred form in the drawing, as more particularly indicated by the claims.

Figure 1:
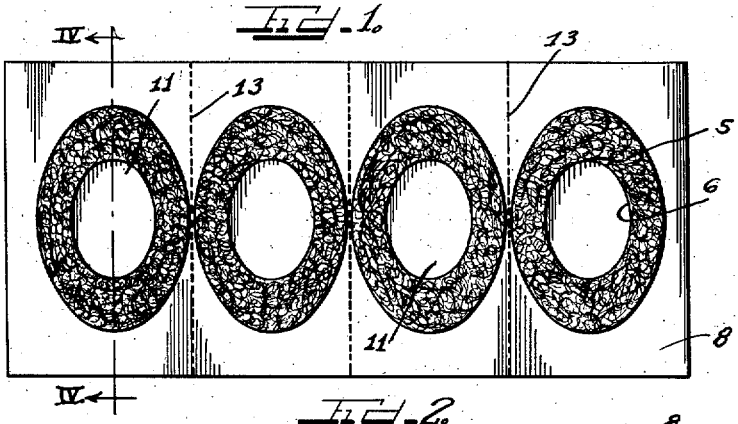
Figure 1 is a front view of a mounting card embodying principles of the present invention, showing the same carrying a plurality of corn or bunion pads.
Figure 2:
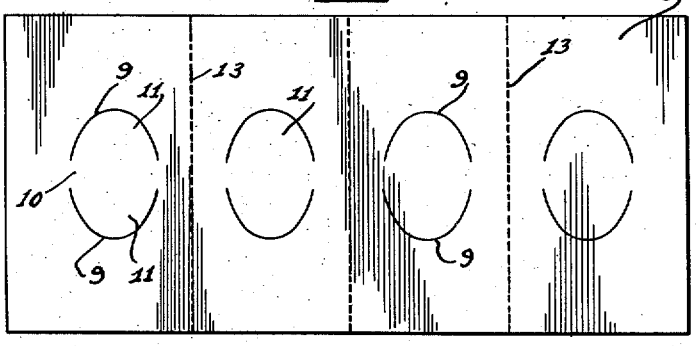
Figure 2 is a front view of the mounting card itself prior to the application of the pads.

The illustrated embodiment of the present invention is shown in conjunction with a corn or bunion pad 5 comprising a piece of felt or cushioning material having a central aperture 6 for the reception of the injured part of the body, and an undersurface or coating 7 of adhesive material for attaching the pad to the body of a user. While in this instance the pad 5 is shown as of a general oval contour and is provided with a complete aperture 6 of the general contour of the pad, it will be understood that the pad may be of any desired configuration as well as the aperture. Further, in many cases, it will not be desirable to have a complete aperture, but a recess may be provided. The adhesived surface or coating 7 may be of any desirable character, but in this instance is shown as that type of glue or adhesive substance requiring moistening or wetting prior to application to the body.

The present invention is illustrated as arranged for supporting medical pads or the like having substantially oval recesses or apertures therein, but it is to be distinctly understood that the invention can readily be modified, in an obvious manner as will later appear, to support pads having recesses or apertures therein of substantially any desirable configuration or contour.

In the present instance, the invention is illustrated as comprising a mounting card 8 which may be made of a suitable light cardboard or reasonably heavy paper stock having the required stiffness for the purposes intended. The mounting card may be die-cut in any desirable size or shape.

Arcuate cuts 9 are provided in the mounting card at properly spaced intervals consistent with the mounting of the pads 5. The cuts 9 for each pad are separate from each other, leaving a continuous portion 10 of the card extending between the adjacent ends of the cuts. These cuts 9 are preferably of the general configuration of opposite portions of the recess or aperture 6 in one of the pads. Thus, they define a pair of opposed oppositely extending tabs 11 for each pad.

Figure 3:
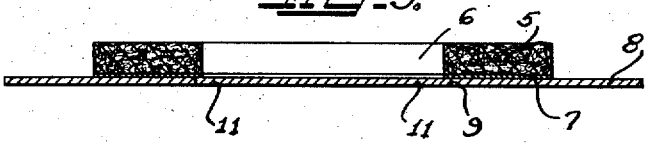
Figure 3 is a transverse vertical sectional view through the card and one of the pads, showing the pad placed in position upon the card just prior to attachment to the card.
Figure 4:
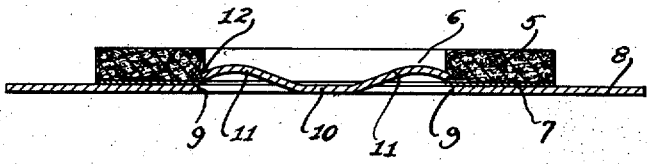
Figure 4 is a transverse vertical sectional view through the structure of Figure 1, taken substantially as indicated by the line IV—IV of Figure 1.

In mounting a pad upon the card, the pad is first placed against the card over a pair of the tabs 11, as indicated in Figure 3. It will also be seen from the disclosure in Figure 3 that the outer ends of the tabs 11 extend slightly beyond the corresponding boundaries of the recess or aperture 6. Accordingly, with the pad held against the mounting card, an application of pressure against the tabs 11 from the rear of the mounting card results in a sufficient deflecting of these tabs for their edges to enter the recess or aperture 6, and the inherent resiliency of the tabs will cause their edges to frictionally engage or bite into the material of the pads 5, as indicated at 12 in Figure 4.

It is preferable to have the tabs 11 engage the cushioning portion of the pad 5 above the adhesive coating 7, but not sufficiently far thereabove to detract from the external appearance of the resultant assembly. In other words, from a front view (Figure 1), it preferably appears as though the tabs 11 were an integral part of the body portion of the card, so that it will be difficult or practically impossible for the eye of the casual observer to tell that the pads are not glued directly to the mounting card. The desired appearance is that of the tabs 11 completely filling the aperture or the opposed portions of the aperture which they engage, with the engagement at such a depth from the top of the aperture so that the tabs appear to be a part of the background. With such mounting, it will be apparent that the card will provide a substantially perfect background for displaying the pads.

The card, of course, may be made of any desirable size to accommodate any desirable number of pads and is of sufficient stiffness so that a card of pads may be removed from its individual wrapper, such as an envelope or box, and placed in position for display purposes. On the other hand, it is equally as feasible to display a larger card holding a number of pads and sell one or more pads directly from the card.

To this end, the card is preferably provided with scored lines or lines of perforation 13 between the pads. It is a simple expedient, then, to tear the card so as to remove a desired number of pads, and the adhesived surface 7 of each pad is adequately protected by the portion of the card removed. This is also desirable for the purpose of removing one pad with the adhesived surface thereof protected so that the pad may be carried in a pocketbook or other article with no further bother.

From the foregoing, it is apparent that I have provided a display card which may be die-cut, if so desired, and which is exceedingly simple in construction and very economical to manufacture. The card has a dual function in that it properly holds a plurality of medical pads or the like and protects the adhesived surfaces thereof, while at the same time the card may be used for purposes of display. Further, it is not necessary to utilize the adhesived surfaces of the pads in any degree whatsoever to mount the pads upon the card, and no extraneous attachment means are needed. When the pads are mounted upon the card, the construction provides a perfect background for display purposes.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. As an article of manufacture, a mounting card for medical pads and the like, including a substantially flat piece of stock having cuts therein defining portions deflectable into frictional engagement with the cushioning portion of a pad.

2. As an article of manufacture, a mounting card for a medical pad and the like, including a piece of stock having a pair of spaced opposed cuts therein defining portions of said piece deflectable from the plane of said piece into engagement with opposed portions of a pad.

3. As an article of manufacture, a mounting card for medical pads and the like having a recess therein, including a piece of stock, and holding means carried by said piece deflectable into engagement with the wall of a pad defining a recess.

4. As an article of manufacture, a mounting card for medical pads and the like, including a single piece of stock having resilient portions thereof deflectable out of the plane of said piece into frictional engagement with the pads to be held, and said piece being arranged for tearing between adjacent pads to facilitate the removal of a portion of the card.

5. In combination, a medical pad having a recess therein, and a mounting card including a piece of stock having opposed cuts therein defining portions shaped complementally to opposed wall portions of the recess and deflectable from the plane of said piece into engagement with said wall portions.

6. In combination, a medical pad having a recess therein, and a mounting card including a piece of stock having opposed cuts therein defining portions shaped complementally to opposed wall portions of the recess and deflectable from the plane of said piece into engagement with said wall portions, the deflectable portions of said piece being inherently resilient for frictional edge engagement with said wall portions to hold the pad and give a background appearance.

7. In combination, a medical pad having an opening therein, and a mounting card including a piece of stock cut to define a resilient portion deflectable from the plane of said piece of stock and into the opening for intimate edge engagement with said pad to hold the pad on the card and provide a complete background appearance.

8. In combination, a medical pad of cushioning material having a recess therein, and a mounting card having cuts therein defining a pair of opposed resilient portions shaped complementally to opposed parts of said recess and said portions being of such size as to extend slightly beyond said opposed parts of the recess, said portions being deflectable from the plane of said mounting card for edge engagement with the cushioning material defining the recess.

9. In combination, a medical pad of cushioning material having an adhesive undercoating, and a mounting card for loosely overlying said undercoating, and said mounting card having a cut therein to define a resilient portion deflectable from the plane of the card into edge engagement with the cushioning material above said undercoating to hold said pad on said card.

10. In combination, a mounting card, a medical pad having a portion of cushioning material and having an opening formed therein, means to removably secure said pad to said card, said means comprising an integral tab deflected from the plane of the card into the opening and into engagement with the cushioning material of said pad, said tab being defined by a cut in said card.

11. In combination, a medical pad element including a body part of relatively soft cushioning material, and a card element of greater area than the pad element and cut to define an intermediate location for said pad element and provide an edge portion for frictional edge to edge engagement with an edge portion of said body part at spaced apart points, one of said elements being deflectable to provide such engagement.

12. In combination, a medical pad including a body portion of yieldable cushioning material, and a mounting card for said pad of greater area than said pad, said mounting card being cut through in an intermediate location to provide an edge spaced from the bounding edges of the card, and said pad being disposed with an edge part of said cushioning material in frictional contact with the major portion of the intermediate edge of said card.

13. In combination, a medical pad including a body portion of cushioning material having an aperture therethrough, and a mounting card for said pad of greater area than the pad, said mounting card having a plurality of spaced cuts in an intermediate location to provide a plurality of edges at spaced apart points, and said pad being disposed with the body portion thereof in frictional edge to edge engagement with each of the intermediate card edges, the card portion inside the cuts being visible as a background through the aperture in said pad.

14. In combination, a medical pad including a part of yieldable cushioning material having a curved edge, and a mounting card for the pad of greater area than the pad, said mounting card being cut in an intermediate location along a curvature complemental to the edge of the pad to provide an intermediate card edge, said cushioning material being in frictional nested edge to edge engagement with the intermediate card edge.

15. In combination, a mounting card, and a pad carried thereby and having a part relatively yieldable in comparison to the relative stiffness of said card, said part being of greater thickness than said card, said card being cut through in an intermediate location to provide an intermediate edge, and said pad being associated with said card with said relatively yieldable part in frictional edge to edge engagement with the major portion of the intermediate card edge.

WILLIAM M. SCHOLL.